F. V. MOORE.
FOLDING AND PASTING MECHANISM FOR MAILING MACHINES.
APPLICATION FILED JAN. 25, 1912.

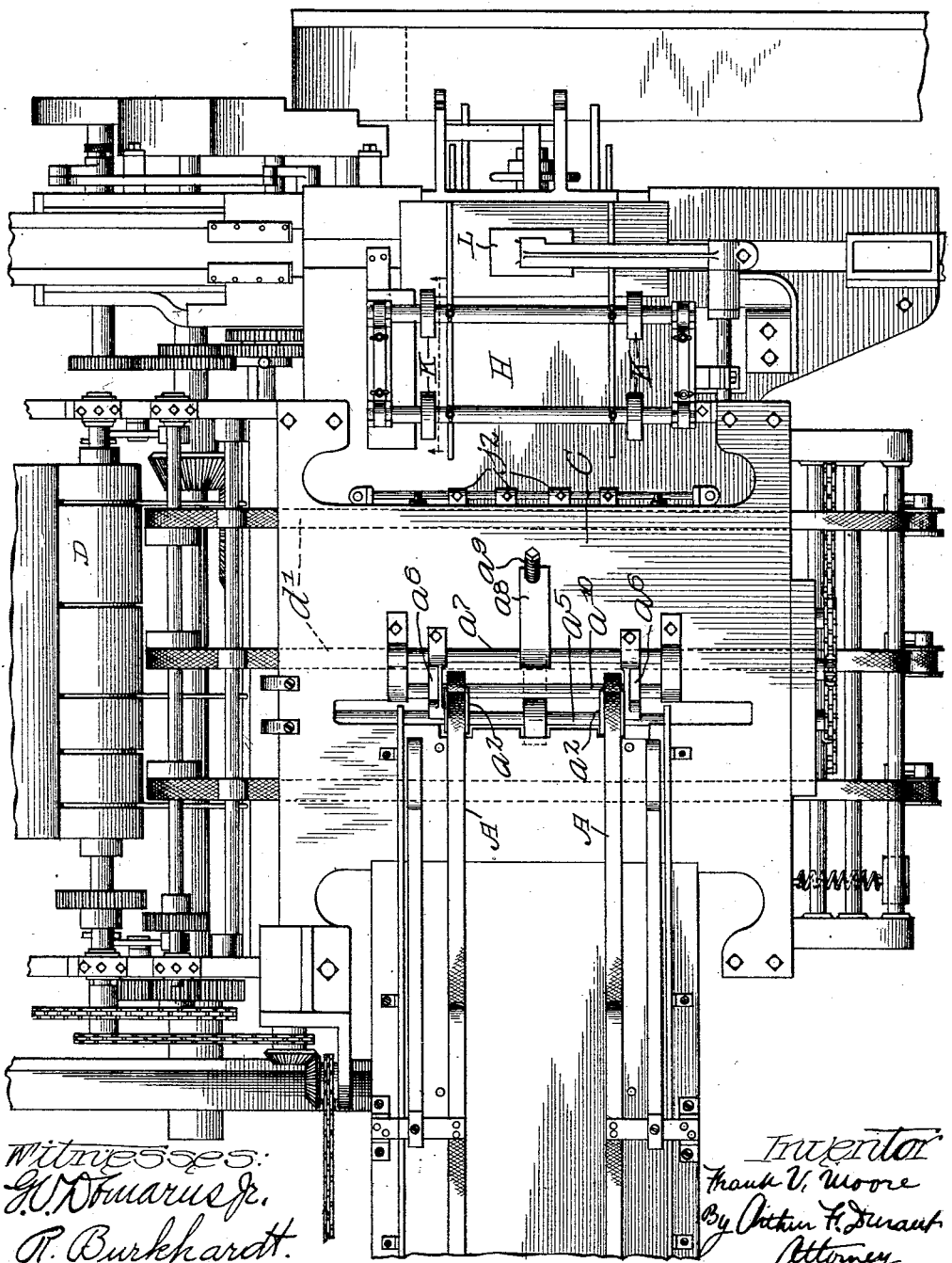

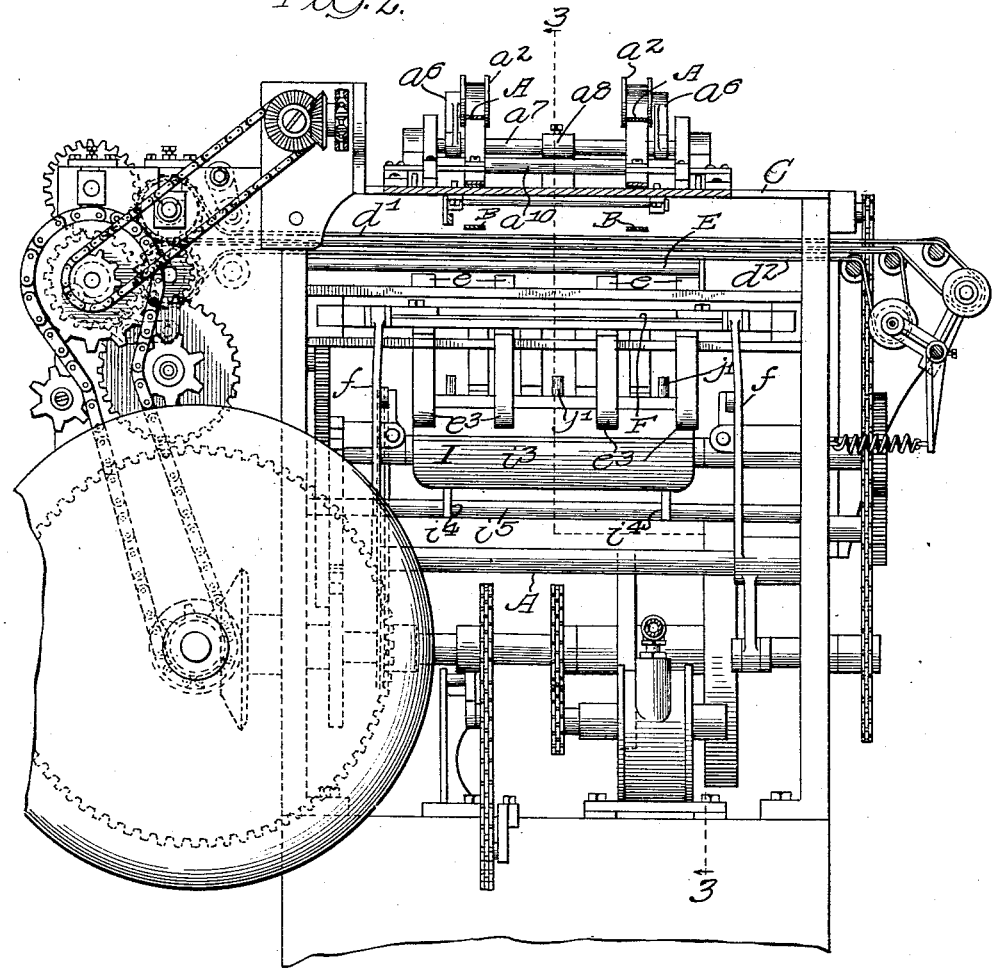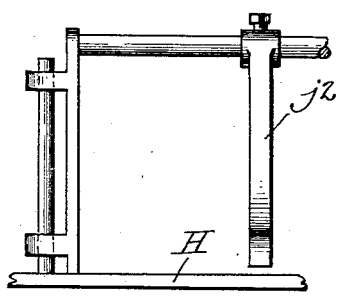

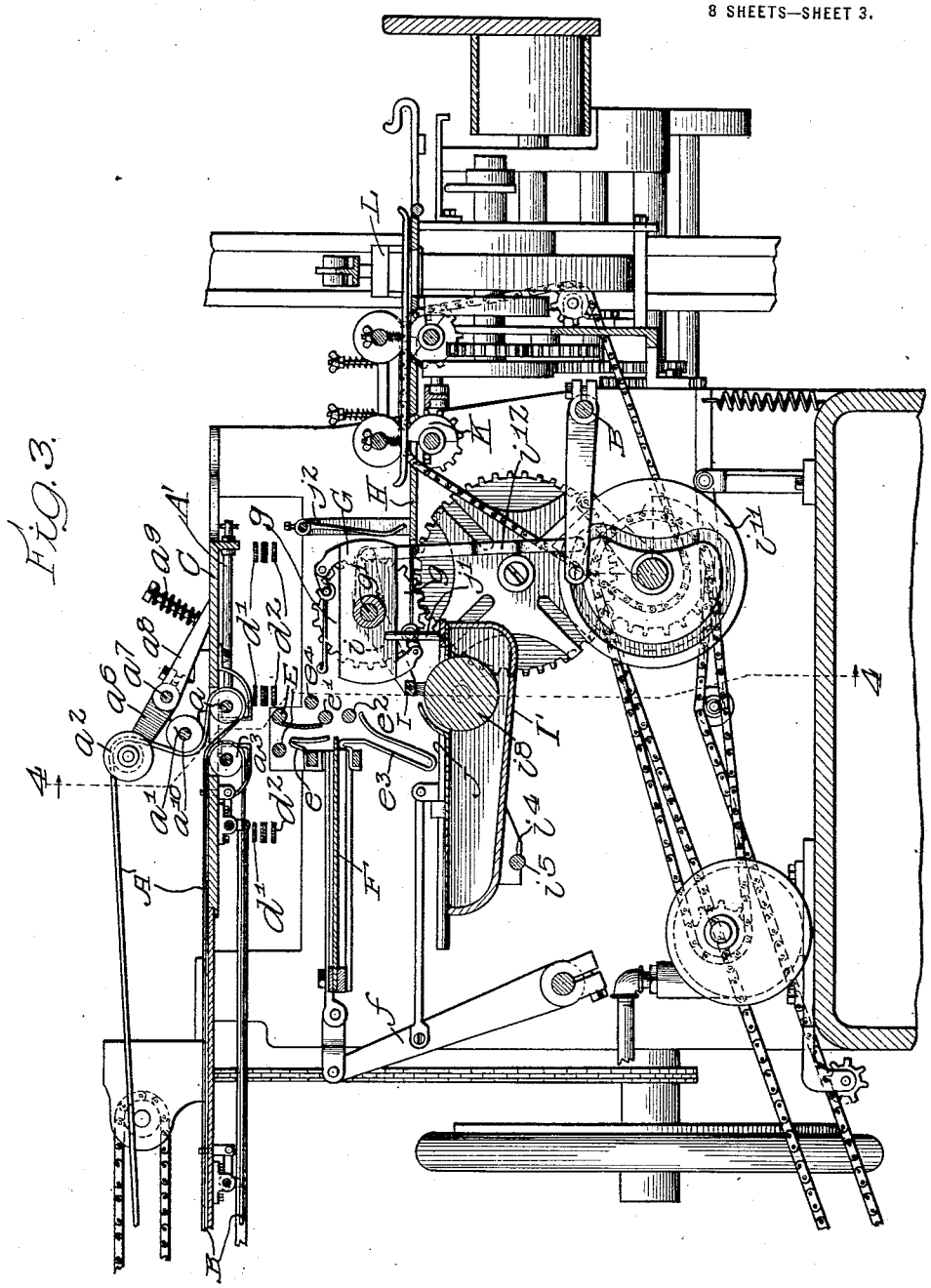

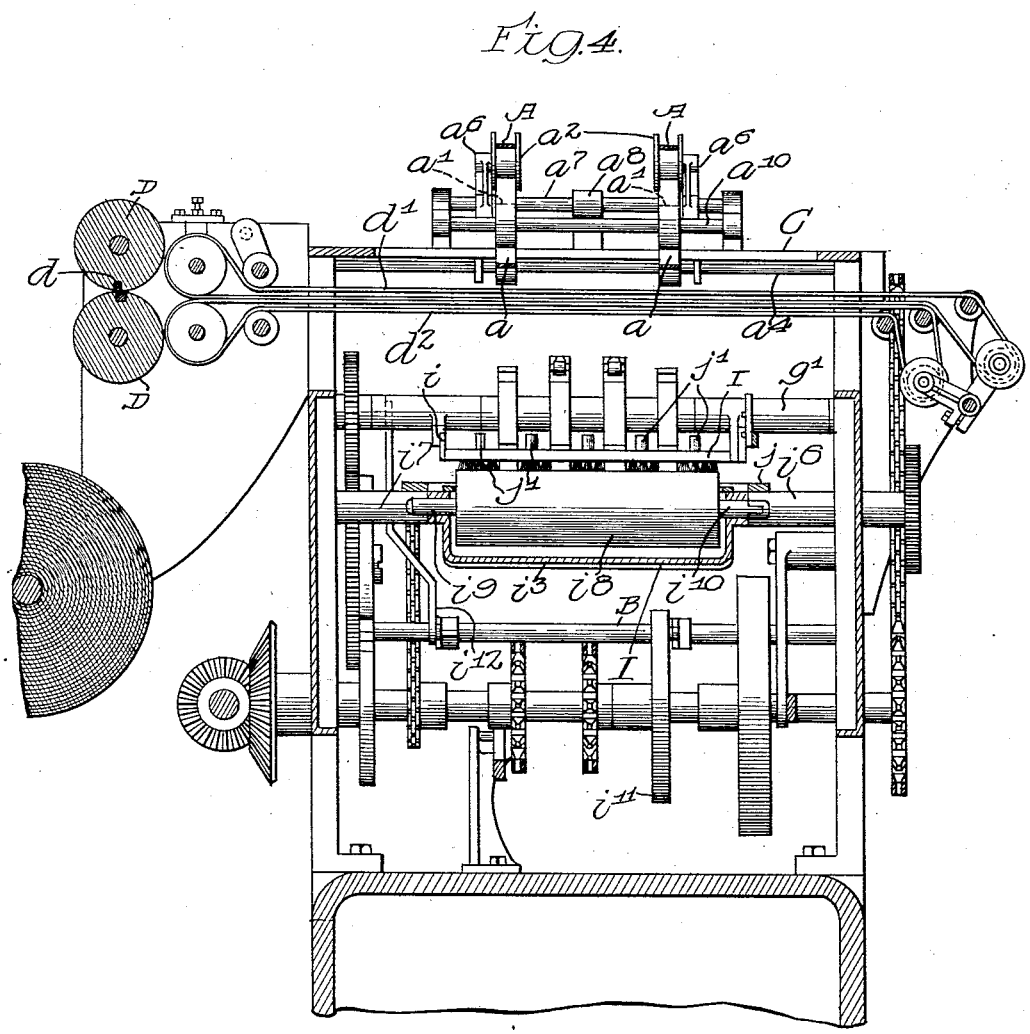

1,161,785.

Patented Nov. 23, 1915.
8 SHEETS—SHEET 7.

F. V. MOORE.
FOLDING AND PASTING MECHANISM FOR MAILING MACHINES.
APPLICATION FILED JAN. 25, 1912.

1,161,785.

Patented Nov. 23, 1915.
8 SHEETS—SHEET 8.

Witnesses:
H. W. Dmarus Jr.
R. Burkhardt.

Inventor:
Frank V. Moore
By Arthur F. Durand
Attorney

UNITED STATES PATENT OFFICE.

FRANK V. MOORE, OF CHICAGO, ILLINOIS, ASSIGNOR, BY MESNE ASSIGNMENTS, TO WOMAN'S WORLD MAGAZINE COMPANY, INC., OF CHICAGO, ILLINOIS, A CORPORATION OF VIRGINIA.

FOLDING AND PASTING MECHANISM FOR MAILING-MACHINES.

1,161,785.  Specification of Letters Patent.  Patented Nov. 23, 1915.

Application filed January 25, 1912. Serial No. 673,363.

*To all whom it may concern:*

Be it known that I, FRANK V. MOORE, a citizen of the United States of America, and resident of Chicago, Cook county, Illinois, have invented a certain new and useful Improvement in Folding and Pasting Mechanism for Mailing-Machines, of which the following is a specification.

My invention relates to mailing machines of that kind in which means are provided for folding and wrapping the magazine and then applying paste to the wrapper to secure the latter upon the folded magazine.

Generally stated, the object of my invention is to provide an improved and highly efficient folding mechanism and pasting mechanism adapted to coöperate in folding the magazine and securing the wrapper thereon.

Special objects are to provide a folding and wrapping mechanism of such character that the unfolded magazine is used as a blade for initially folding the wrapper; to provide an improved construction and arrangement whereby the magazine is only folded once; to provide an improved construction and arrangement whereby the paste is applied by a brush that moves bodily and oscillates at the same time about a longitudinal axis; and to provide certain details and features of improvement tending to increase the general efficiency of a machine of this particular character.

To these and other useful ends, my invention consists in matters hereinafter set forth and claimed.

Figure 5:
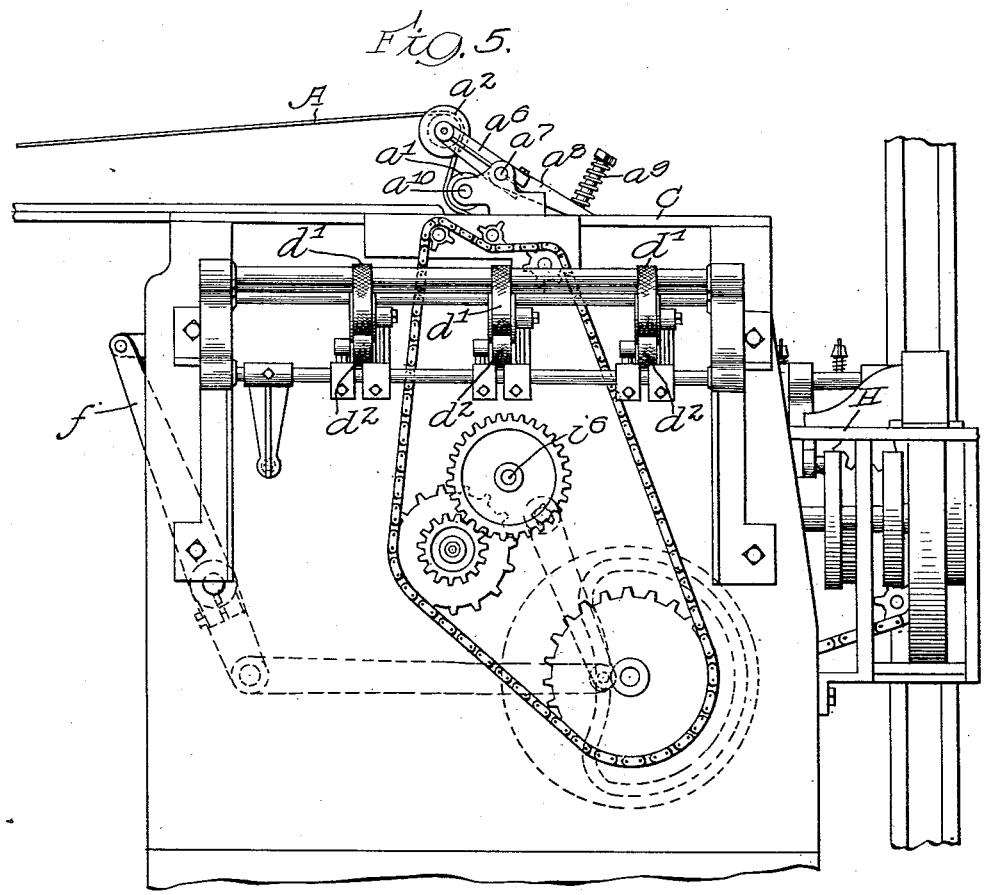
Figure 6:
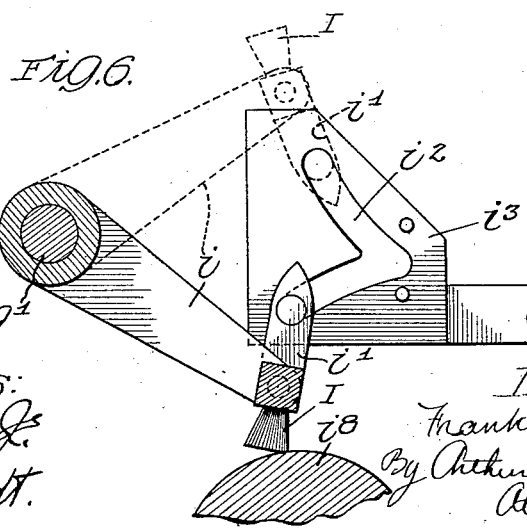
Figure 7:
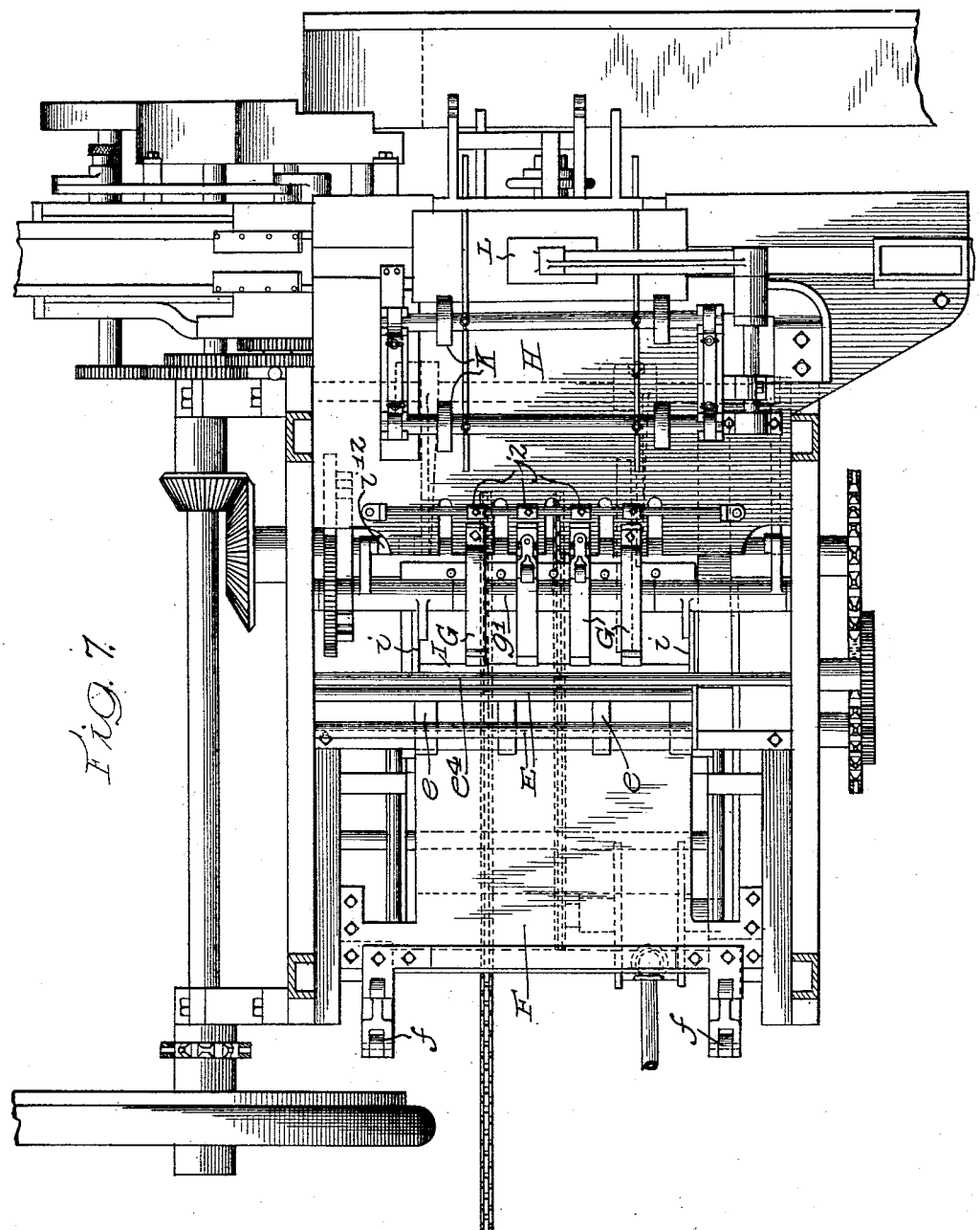
Figure 8:
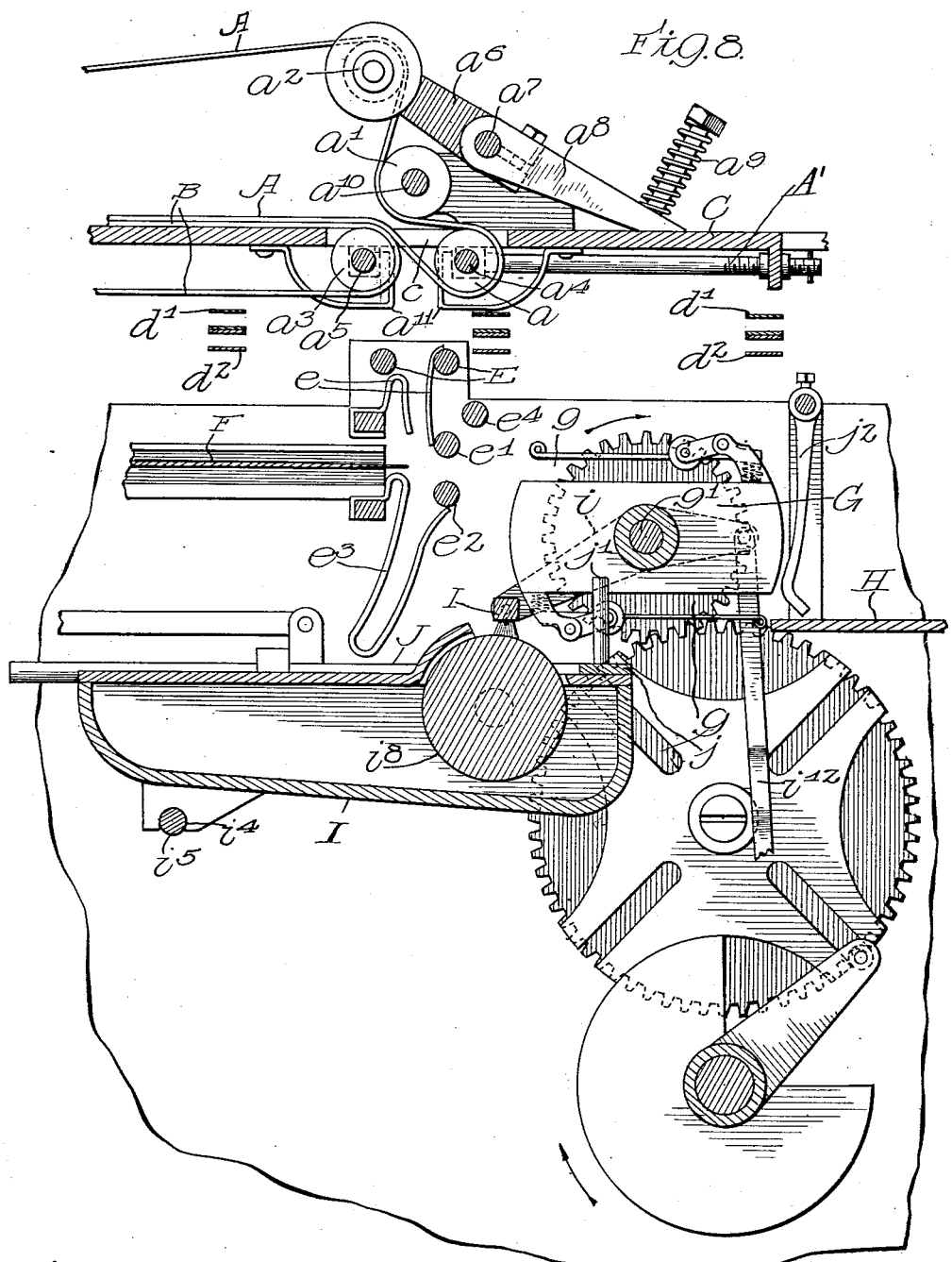
Figure 9:
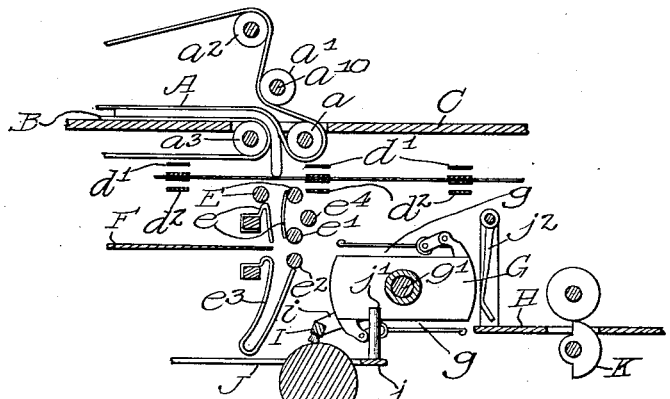

In the accompanying drawings, Figure 1 is a plan of a mailing machine embodying the principles of my invention, showing the end portion thereof broken away for convenience of illustration, the portion thus not shown being the elevator for feeding the magazines to the end of the conveyer by which they are carried to the folding and wrapping and pasting devices at the center of the machine. Fig. 2 is an end elevation of the machine shown in Fig. 1. Fig. 3 is a longitudinal vertical section on line 3—3 in Fig. 2. Fig. 4 is a transverse vertical section on line 4—4 in Fig. 3. Fig. 5 is a side elevation of the said machine. Fig. 6 is an enlarged detail view of the paste brush and the means for causing the same to oscillate about a longitudinal axis while moving bodily back and forth. Fig. 7 is a view similar to Fig. 1, but showing the magazine and wrapper feeding devices removed to bring into view the folding and pasting devices below. Fig. 8 is an enlarged longitudinal sectional view of the folding and wrapping and pasting devices of the machine. Figs. 9 to 12, inclusive, are diagrammatic views showing the manner in which the magazine is folded and wrapped and the paste applied to the wrapper. Fig. 13 is a detail view showing the well known method of mounting the fingers by which the flap is pressed down after being smeared with paste.

As thus illustrated, my invention comprises the upper and lower belts A and B of the conveyer by which the magazines are carried in a flat condition to the folding mechanism. The upper belts A travel around the rolls $a$, $a'$ and $a^2$, which are supported by the table C. The lower belts B travel around the rolls $a^3$, the upper portions of these belts resting flatwise upon the said table. The rolls $a$ and $a^3$ are below said table, and at opposite sides of the transverse slot $c$ in said table, the rolls $a$ being adjustable toward and away from said rolls $a^3$. The adjustment can be obtained by any suitable means, or by screws A′ applied to the bearings of said roll. The rolls are mounted on safts $a^4$ and $a^5$, and the opposite ends of the shaft $a^4$ are adjustable independently of each other by means of the movable bearings shown in dotted lines, mounted for adjustment in any suitable, known or approved manner, whereby the two rolls $a$ are, as stated, adjustable toward and away from the rolls $a^3$. In this way the grip of the belts on the magazines can be regulated to keep them moving squarely and in proper position for delivery to the folding mechanism. The rolls $a^2$ are carried on arms $a^6$ mounted on the rock shaft $a^7$. An arm $a^8$ is secured to the shaft $a^7$ and held yieldingly down by a spring $a^9$ suitably mounted on the table. The rolls $a'$ are mounted on the shaft $a^{10}$ and disposed in position to engage the outer surfaces of the belts A at a point between the rolls $a$ and $a^2$. It will be understood that the shafts $a^4$, $a^5$, $a^7$ and $a^{10}$ are all mounted in suitable bearings on the table. The lower portions of the belts A rest on the upper portions of the belts B, and the magazines are carried between. As the magazine travels around the rolls $a^3$ it comes into position to pass downward, rear edge first, being assisted in this respect by the guides $a^{11}$ on the bottom of the table at each side of the slot $c$ therein, these guides constituting means for deflecting the magazine downward from said rolls.

Any suitable mechanism can be employed for feeding the wrappers for the magazines. As shown, the strip of paper for the wrappers is fed between the rolls D the upper one of which carries a knife $d$ by which the paper is cut into sections of proper length to make the wrappers. These wrappers are fed between the upper and lower belts $d'$ and $d^2$ which extend crosswise of the machine. There are three upper belts $d'$, shown in Fig. 3, and as many lower belts $d^2$, the upper ones resting on the lower ones. It will also be seen that these belts are so located that the rear edge of the downwardly moving magazine engages the wrapper at one side of the center thereof. (See Fig. 9.) This pulls the wrapper from the belts and forces it downward.

Figure 10:
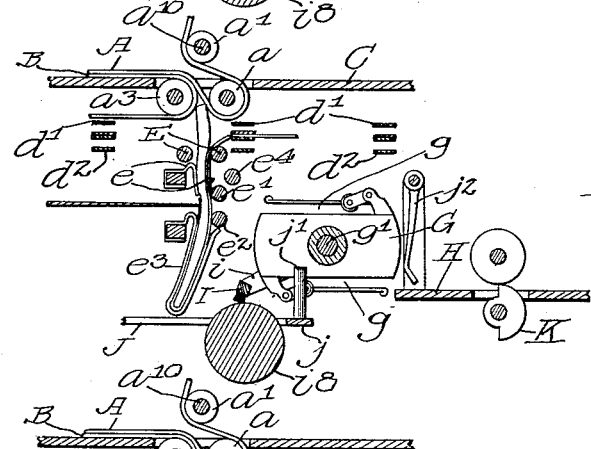

Directly below the slot $c$ a couple of transverse rods E are mounted on the machine to form a slot between them, which slot is directly in line with the path of the downwardly moving magazines. The guides $e$ extend downwardly from these rods E, and a rod $e'$ is disposed at the lower ends thereof below one of the rods E. Another rod $e^2$ is disposed below the rod $e'$, and the bottom of the pocket is formed by the hook-shaped guides $e^3$ secured to the frame of the machine. Into this pocket the wrapper is forced by the magazine, the latter acting as a blade for this purpose. Thus the unfolded magazine is employed as a blade for initially folding the wrapper. When thus folded the wrapper rests in the pocket as shown in Fig. 10, one edge of the wrapper being at the middle of one side of the magazine, and the other edge portion of the wrapper being still between the middle belts $d'$ and $d^2$. The magazine is now ready to be folded.

A horizontal blade F is mounted in position to engage the magazine and wrapper at the edge of the latter, as shown in Fig. 10, and is adapted to force the magazine and wrapper between the rods $e'$ and $e^2$ to fold them. This blade is operated by an arm $f$, which latter may be actuated at the proper time by any suitable mechanism. When discharged from the slot between the rods $e'$ and $e^2$ the magazine and wrapper are ready for sealing.

Figure 11:
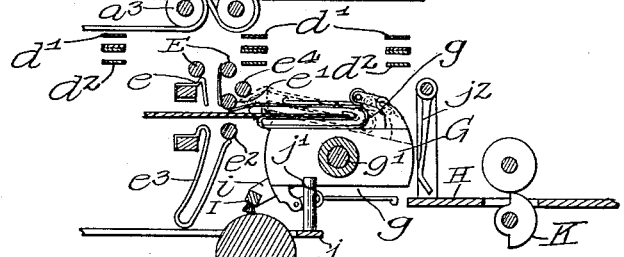
Figure 12:
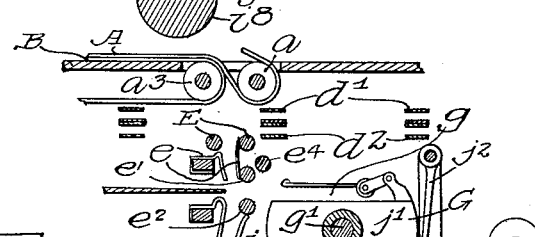

The pasting mechanism comprises a rotary element G, of well known construction, having slots $g$, and mounted to turn on the shaft $g'$ that extends transversely of the machine. The said element G is rotated in the direction indicated by the arrow in Fig. 8, and is always ready with one of its slots $g$ in position to receive the folded magazine and wrapper, as shown in Fig. 11, and is then rotated to bring the wrapped magazine into position to be discharged on to the table H. Before this rotation, however, the flap of the wrapper is smeared on its inner surface with paste. This is done by the brush I which is mounted to rotate about a longitudinal axis, being rotatively mounted at the ends of the arms $i$. These arms are mounted to turn on the shaft $g'$, and are rocked thereon by any suitable mechanism, whereby the brush is raised and lowered bodily. At the same time the brush is oscillated by the engagement of its arms $i'$ with the cam slots or grooves $i^2$ formed in plates $i^3$ on the frame of the machine. Thus the brush is turned upside down when it is raised. (See Fig. 6). The receptacle I' is provided with notches $i^4$ which engage the cross bar $i^5$ on the frame of the machine. The said frame is provided with supports $i^6$ and $i^7$, and the paste roller $i^8$ is mounted in bearings on the same receptacle and formed, in the usual manner, with end portions $i^9$ and $i^{10}$ that enter laterally the sockets in the ends of the said supports, being held thus by the engagement of the rod $i^5$ with the bottom of the receptacle. Means are provided, in a well known manner, for engaging the end portion $i^{10}$ to rotate the roller $i^8$ and thereby keep the latter covered with paste. The brush L drags on the said roller and, at the proper time, moves upward and turns around to smear the underside of the wrapper flap, as shown in dotted lines in Fig. 11. The rise and fall of the brush is preferably produced by a cam $i^{11}$ which is suitably connected with the lower end of a rod $i^{12}$ connected at its upper end with the arms $i$ by which the brush is supported. At this time the brush presses the flap against the rod $e^4$ to more firmly apply the paste. The magazine and wrapper are now ready to be discharged from the element G, which is done by the following means:—A slide J is mounted to slide on the frame, in the usual way, and has a front portion $j$ that moves back and forth at the top of the paste receptacle I'. This portion $j$ is provided with upstanding pins $j'$ that push the folded magazine and wrapper out of the slot $g$, as shown in Fig. 12, and onto the table H. When this is done, the fingers $j^2$, which are also old and well known, fold the flap of the wrapper down upon the other edge portion thereof, thus sealing the wrapper. During the rotation of the element G the said flap strikes the fingers $j^2$ and thereby partially folds the same, which folding is completed by the discharge of the magazine from the slot $g$ and onto the said table. These fingers are mounted to move yieldingly up and down, in the well known manner, as indicated in Fig. 13. This permits the folded magazine to pass under the fingers. The slide J is operated as usual by a connection with the lever or arm f. The ordinary and well known means can be employed for rotating the element G in an intermittent manner. The pasting mechanism thus shown and described is all old and well known, with the exception, however, of the brush L and the means for operating it, and this I regard as an important feature of improvement on a pasting mechanism of this character. With this brush the pasting operation is rendered certain and effective.

From the table H the folded and wrapped magazines are fed by a feed mechanism K to the addressing mechanism L. But as this feed mechanism is the subject of another application, (now Patent No. 1,060,276) no further explanation thereof is necessary.

From the foregoing it will be seen that I provide an improved and highly efficient folding and wrapping and pasting mechanism for use in various kinds of machinery, but adapted more particularly for use in a mailing machine in which the wrapped magazines are fed to an addressing mechanism. As the magazine is only folded once, the operation is simplified, and the feeding and addressing of the magazine is rendered easy and more satisfactory. Also, the magazines are made satisfactory for transmission through the mails in a better way than heretofore. A machine characterized by my invention can be run at high speed, and a larger number of magazines can be handled in a given time than heretofore. Moreover, the improved construction prevents the objectionable pound and vibration which characterize some machines previously employed for this purpose.

What I claim as my invention is:

1. In a mailing machine, means for feeding the wrapper below and lengthwise of the lower edge of the magazine, mechanism for feeding the magazine in unfolded condition, disposed in position whereby the forward edges of the wrapper and magazine are at right angles to each other, devices for effecting the initial folding of the wrapper by the initial contact of the unfolded magazine therewith, a blade for striking the unfolded magazine at the edge of the wrapper to fold the same, and means whereby the magazine and wrapper are held stationary until after the blade is withdrawn therefrom.

2. In a mailing machine, means for feeding the wrapper below and lengthwise of the lower edge of the magazine, mechanism for feeding the magazine in unfolded condition, disposed in position whereby the forward edges of the wrapper and magazine are at right angles to each other, devices for effecting the initial folding of the wrapper by the initial contact of the unfolded magazine therewith, said means disposed in position to present the flat upper surface of the unfolded wrapper to the advancing edge of the unfolded magazine, said devices including means for receiving the magazine and wrapper and thereby folding the latter but not the former, a blade for striking the unfolded magazine at the edge of the wrapper to fold the same, and means whereby the magazine and wrapper are held stationary until after the blade is withdrawn therefrom.

3. In a mailing machine, means for feeding the wrapper below and lengthwise of the lower edge of the magazine, mechanism for feeding the magazine in unfolded condition, disposed in position whereby the forward edges of the wrapper and magazine are at right angles to each other, devices for effecting the initial folding of the wrapper by the initial contact of the unfolded magazine therewith, said mechanism for feeding the magazine being adapted to discharge the latter edgewise against the flat surface of the unfolded wrapper, a blade for striking the unfolded magazine at the edge of the wrapper to fold the same, and means whereby the magazine and wrapper are held stationary until after the blade is withdrawn therefrom.

4. In a mailing machine, means for feeding the wrapper below and lengthwise of the lower edge of the magazine, mechanism for feeding the magazine in unfolded condition, disposed in position whereby the forward edges of the wrapper and magazine are at right angles to each other, devices for effecting the initial folding of the wrapper by the initial contact of the unfolded magazine therewith, said means disposed in position to present the flat upper surface of the unfolded wrapper to the advancing edge of the unfolded magazine, said devices including means for receiving the magazine and wrapper and thereby folding the latter but not the former, said mechanism having the discharge end thereof disposed in position to cause the edge of the magazine to strike the wrapper at a point to one side of the center of the latter, a blade for striking the unfolded magazine at the edge of the wrapper to fold the same, and means whereby the magazine and wrapper are held stationary until after the blade is withdrawn therefrom.

5. In a mailing machine, means for feeding the wrapper below and lengthwise of the lower edge of the magazine, mechanism for feeding the magazine in unfolded condition, disposed in position whereby the forward edges of the wrapper and magazine are at right angles to each other, devices for effecting the initial folding of the wrapper by the initial contact of the unfolded magazine therewith, said mechanism for feeding the magazine being adapted to discharge the latter edgewise against the flat surface of the unfolded wrapper, said mechanism having the discharge end thereof disposed in position to cause the edge of the magazine to strike the wrapper at a point to one side of the center of the latter, a blade for striking the unfolded magazine at the edge of the wrapper to fold the same, and means whereby the magazine and wrapper are held stationary until after the blade is withdrawn therefrom.

6. In a mailing machine, means for feeding the wrapper, mechanism for feeding the magazine in unfolded condition, devices for effecting the initial folding of the wrapper by the feeding of the magazine, a brush, means for operating the brush up and down, and means for oscillating said brush to apply an adhesive to the loose flap of the wrapper, after the wrapper is folded about the magazine.

7. In a mailing machine, means for feeding the wrapper, mechanism for feeding the magazine in unfolded condition, devices for effecting the initial folding of the wrapper by the feeding of the magazine, said means disposed in position to present the flat upper surface of the unfolded wrapper to the advancing edge of the unfolded magazine, said devices including means for receiving the magazine and wrapper and thereby folding the latter but not the former, a brush, means for operating the brush up and down, and means for controlling said brush to apply an adhesive to the loose flap of the wrapper, after the wrapper is folded about the magazine.

8. In a mailing machine, means for feeding the wrapper, mechanism for feeding the magazine in unfolded condition, devices for effecting the initial folding of the wrapper by the feeding of the magazine, said mechanism for feeding the magazine being adapted to discharge the latter edgewise against the flat surface of the unfolded wrapper, a brush, means for operating the brush up and down, and means for controlling said brush to apply an adhesive to the loose flap of the wrapper, after the wrapper is folded about the magazine.

9. In a mailing machine, means for feeding the wrapper, mechanism for feeding the magazine in unfolded condition, devices for effecting the initial folding of the wrapper by the feeding of the magazine, said means disposed in position to present the flat upper surface of the unfolded wrapper to the advancing edge of the unfolded magazine, said devices including means for receiving the magazine and wrapper and thereby folding the latter but not the former, said mechanism having the discharge end thereof disposed in position to cause the edge of the magazine to strike the wrapper at a point to one side of the center of the latter, a brush, means for operating the brush up and down, and means for controlling said brush to apply an adhesive to the loose flap of the wrapper, after the wrapper is folded about the magazine.

10. In a mailing machine, means for feeding the wrapper, mechanism for feeding the magazine in unfolded condition, devices for effecting the initial folding of the wrapper by the feeding of the magazine, said mechanism for feeding the magazine being adapted to discharge the latter edgewise against the flat surface of the unfolded wrapper, said mechanism having the discharge end thereof disposed in position to cause the edge of the magazine to strike the wrapper at a point to one side of the center of the latter, a brush, means for operating the brush up and down, and means for controlling said brush to apply an adhesive to the loose flap of the wrapper, after the wrapper is folded about the magazine.

11. In a mailing machine, means for feeding the wrapper, mechanism for feeding the magazine in unfolded condition, devices for effecting the initial folding of the wrapper by the feeding of the magazine, and instrumentalities for folding the magazine and wrapper, securing the flap in place, and expelling the folded and wrapped magazine with its flap edge forward, said means disposed transversely of said mechanism, whereby the advancing edges of the unfolded magazine and detached wrapper are at right angles to each other, and said devices comprising a slot into which the wrapper is pushed by the folded magazine, and said instrumentalities including stationary means forming a narrow second slot, and a blade for pushing the magazine and wrapper through the second slot, thereby folding the same.

12. In a mailing machine, means for feeding the wrapper, mechanism for feeding the magazine in unfolded condition, devices for effecting the initial folding of the wrapper by the feeding of the magazine, and instrumentalities for folding the magazine and wrapper, securing the flap in place, and expelling the folded and wrapped magazine with its flap edge forward, said means disposed in position to present the flat upper surface of the unfolded wrapper to the advancing edge of the unfolded magazine, said devices including means for receiving the magazine and wrapper and thereby folding the latter but not the former, said means disposed transversely of said mechanism, whereby the advancing edges of the unfolded magazine and detached wrapper are at right angles to each other, and said devices comprising a slot into which the wrapper is pushed by the unfolded magazine, and said instrumentalities including stationary means forming a narrow second slot, and a blade for pushing the magazine and wrapper through the second slot, thereby folding the same.

13. In a mailing machine, means for feeding the wrapper, mechanism for feeding the magazine in unfolded condition, devices for effecting the initial folding of the wrapper by the feeding of the magazine, and instrumentalities for folding the magazine and wrapper, securing the flap in place, and expelling the folded and wrapped magazine with its flap edge forward, said mechanism for feeding the magazine being adapted to discharge the latter edgewise against the flat surface of the unfolded wrapper, said means disposed transversely of said mechanism, whereby the advancing edges of the unfolded magazine and detached wrapper are at right angles to each other, and said devices comprising a slot into which the wrapper is pushed by the unfolded magazine, and said instrumentalities including stationary means forming a narrow second slot, and a blade for pushing the magazine and wrapper through the second slot, thereby folding the same.

14. In a mailing machine, means for feeding the wrapper, mechanism for feeding the magazine in unfolded condition, devices for effecting the initial folding of the wrapper by the feeding of the magazine, and instrumentalities for folding the magazine and wrapper, securing the flap in place, and expelling the folded and wrapped magazine with its flap edge forward, said means disposed in position to present the flat upper surface of the unfolded wrapper to the advancing edge of the unfolded magazine, said devices including means for receiving the magazine and wrapper and thereby folding the latter but not the former, said mechanism having the discharge end thereof disposed in position to cause the edge of the magazine to strike the wrapper at a point to one side of the center of the latter, said means disposed transversely of said mechanism, whereby the advancing edges of the unfolded magazine and detached wrapper are at right angles to each other, and said devices comprising a slot into which the wrapper is pushed by the unfolded magazine, and said instrumentalities including stationary means forming a narrow second slot, and a blade for pushing the magazine and wrapper through the second slot, thereby folding the same.

15. In a mailing machine, means for feeding the wrapper, mechanism for feeding the magazine in unfolded condition, devices for effecting the initial folding of the wrapper by the feeding of the magazine, and instrumentalities for folding the magazine and wrapper, securing the flap in place, and expelling the folded and wrapped magazine with its flap edge forward, said mechanism for feeding the magazine being adapted to discharge the latter edgewise against the flat surface of the unfolded wrapper, said mechanism having the discharge end thereof disposed in position to cause the edge of the magazine to strike the wrapper at a point to one side of the center of the latter, said means disposed transversely of said mechanism, whereby the advancing edges of the unfolded magazine and detached wrapper are at right angles to each other, and said devices comprising a slot into which the wrapper is pushed by the unfolded magazine, and said instrumentalities including stationary means forming a narrow second slot, and a blade for pushing the magazine and wrapper through the second slot, thereby folding the same.

16. In a mailing machine, means for feeding the wrapper, mechanism for feeding the magazine in unfolded condition, devices for effecting the initial folding of the wrapper by the feeding of the magazine, a brush, a paste roller, means for moving the brush bodily, relative to said roller, and means for reversing the brush to bring it into position to apply an adhesive to the flap of the wrapper.

17. In a mailing machine, means for feeding the wrapper, mechanism for feeding the magazine in unfolded condition, and devices for effecting the initial folding of the wrapper by the feeding of the magazine, said means disposed in position to present the flat upper surface of the unfolded wrapper to the rear edge of the unfolded magazine, said devices including means for receiving the magazine and wrapper and thereby folding the latter but not the former, a brush, a paste roller, means for moving the brush bodily, relative to said roller, and means for reversing the brush to bring it into position to apply an adhesive to the flap of the wrapper.

18. In a mailing machine, means for feeding the wrapper, mechanism for feeding the magazine in unfolded condition, devices for effecting the initial folding of the wrapper by the feeding of the magazine, said mechanism for feeding the magazine being adapted to discharge the latter edgewise against the flat surface of the unfolded wrapper, a brush, a paste roller, means for moving the brush bodily, relative to said roller, and means for reversing the brush to bring it into position to apply an adhesive to the flap of the wrapper.

19. In a mailing machine, means for feeding the wrapper, mechanism for feeding the magazine in unfolded condition, devices for effecting the initial folding of the wrapper by the feeding of the magazine, said means disposed in position to present the flat upper surface of the unfolded wrapper to the advancing edge of the unfolded magazine, said devices including means for receiving the magazine and wrapper and thereby folding the latter but not the former, said mechanism having the discharge end thereof disposed in position to cause the edge of the magazine to strike the wrapper at a point to one side of the center of the latter, a brush, a paste roller, means for moving the brush bodily, relative to said roller, and means for reversing the brush to bring it into position to apply an adhesive to the flap of the wrapper.

20. In a mailing machine, means for feeding the wrapper, mechanism for feeding the magazine in unfolded condition, devices for effecting the initial folding of the wrapper by the feeding of the magazine, said mechanism for feeding the magazine being adapted to discharge the latter edgewise against the flat surface of the unfolded wrapper, said mechanism having the discharge end thereof disposed in position to cause the edge of the magazine to strike the wrapper at a point to one side of the center of the latter, a brush, a paste roller, means for moving the brush bodily, relative to said roller, and means for reversing the brush to bring it into position to apply an adhesive to the flap of the wrapper.

21. In a mailing machine for securing wrappers on magazines, the wrappers having flaps, a pasting mechanism comprising a rotary brush, a movable support upon which said brush is mounted to rotate, cam mechanism for controlling the motion of said support, a cam device for controlling the rotation of the brush, a paste roller below the brush, and a backing for the flap of the wrapper, disposed above the brush, in combination with means for revolving the magazine to draw the flap of the wrapper away from said brush.

22. In a mailing machine for securing wrappers on magazines, the wrappers having flaps, a pasting mechanism, comprising a brush, means for moving the brush bodily, means for oscillating the brush during its back and forth bodily movement, a paste roller below the brush, and a backing for the flap of the wrapper, disposed above the brush, in combination with means for revolving the magazine to draw the flap of the wrapper away from said brush.

23. In a mailing machine, a frame, a cross bar on the frame, a pasting mechanism comprising a receptacle, a roller in said receptacle, means on the receptacle for removably engaging the said cross bar, means on the frame for supporting the receptacle by engaging the ends of said roller, and means for driving the roller at one end thereof, said receptacle being removable endwise by disengagement thereof from said cross bar, an oscillating brush for applying the paste, means for feeding the magazine and wrapper to said mechanism, and means sliding on the top of the said receptacle for discharging the magazine from the pasting mechanism.

24. In a mailing machine, a frame, a cross bar on the frame, a pasting mechanism comprising a receptacle, a roller in said receptacle, means on the receptacle for removably engaging the said cross bar, means on the frame for supporting the receptacle by engaging the ends of said roller, means for driving the roller at one end thereof, said receptacle being removable endwise by disengagement thereof from said cross bar, means for feeding the magazine and wrapper to said mechanism, means sliding on the top of the said receptacle for discharging the magazine from the pasting mechanism, a brush for carrying the paste from the roller to the wrapper of the magazine, means for moving the brush bodily, and means for oscillating the brush.

25. In a mailing machine, a brush for applying the paste to the wrapper of a magazine, means for oscillating said brush about a longitudinal axis, means for moving the brush bodily back and forth to produce the said oscillation thereof, a folding blade, and means for withdrawing the blade from the magazine to permit said brush to make contact with the flap of the wrapper.

26. In a mailing machine, means for feeding the wrapper, mechanism for feeding the magazine in unfolded condition, and devices for effecting the initial folding of the wrapper by the feeding of the magazine, a folding blade, a rotary element having two pockets, means for causing the blade to push the magazine and wrapper into one pocket, means for then applying paste to the flap of the wrapper, means for rotating said element, an ejector and means whereby the ejector pushes the magazine and wrapper out of the one pocket at the same time that the blade pushes another magazine and wrapper into the other pocket.

27. In a mailing machine, means for feeding the wrapper, mechanism for feeding the magazine in unfolded condition, and devices for effecting the initial folding of the wrapper by the feeding of the magazine, said means disposed in position to present the flat upper surface of the unfolded wrapper to the edge of the unfolded magazine, and said devices including means for receiving the magazine and wrapper and thereby feeding the latter but not the former, a folding blade, a rotary element having two pockets, means for causing the blade to push the magazine and wrapper into one pocket, means for then applying paste to the flap of the wrapper, means for rotating said element, an ejector and means whereby the ejector pushes the magazine and wrapper out of the one pocket at the same time that the blade pushes another magazine and wrapper into the other pocket.

28. In a mailing machine, means for feeding the wrapper, mechanism for feeding the magazine in unfolded condition, and devices for effecting the initial folding of the wrapper by the feeding of the magazine, said mechanism for feeding the magazine being adapted to discharge the latter edgewise against the flat surface of the unfolded wrapper, a folding blade, a rotary element having two pockets, means for causing the blade to push the magazine and wrapper into one pocket, means for then applying paste to the flap of the wrapper, means for rotating said element, an ejector and means whereby the ejector pushes the magazine and wrapper out of the one pocket at the same time that the blade pushes another magazine and wrapper into the other pocket.

29. In a mailing machine, means for feeding the wrapper, mechanism for feeding the magazine in unfolded condition, devices for effecting the initial folding of the wrapper by the feeding of the magazine, said means disposed in position to present the flat upper surface of the unfolded wrapper to the edge of the unfolded magazine, and said devices including means for receiving the magazine and wrapper and thereby folding the latter but not the former, said mechanism having the discharge end thereof disposed in position to cause the edge of the magazine to strike the wrapper at a point to one side of the center of the latter, a folding blade, a rotary element having two pockets, means for causing the blade to push the magazine and wrapper into one pocket, means for then applying paste to the flap of the wrapper, means for rotating said element, an ejector and means whereby the ejector pushes the magazine and wrapper out of the one pocket at the same time that the blade pushes another magazine and wrapper into the other pocket.

30. In a mailing machine, means for feeding the wrapper, mechanism for feeding the magazine in unfolded condition, and devices for effecting the initial folding of the wrapper by the feeding of the magazine, said mechanism for feeding the magazine being adapted to discharge the latter edgewise against the flat surface of the unfolded wrapper, said mechanism having the discharge end thereof disposed in position to cause the edge of the magazine to strike the wrapper at a point to one side of the center of the latter, a folding blade, a rotary element having two pockets, means for causing the blade to push the magazine and wrapper into one pocket, means for then applying paste to the flap of the wrapper, means for rotating said element, an ejector and means whereby the ejector pushes the magazine and wrapper out of the pocket at the same time that the blade pushes another magazine and wrapper into the other pocket.

31. In a mailing machine, means for feeding the wrapper, mechanism for feeding the magazine in unfolded condition and devices for effecting the initial folding of the wrapper by the feeding of the magazine, means for folding the magazine and wrapper, a carrier for receiving the folded magazine and wrapper directly from said folding means, means for applying paste to the flap of the wrapper, mechanism for operating said carrier, means whereby the carrier discharges one magazine while receiving another, and means for folding said flap into place on the discharging magazine.

32. In a mailing machine, means for feeding the wrapper, mechanism for feeding the magazine in unfolded condition, and devices for effecting the initial folding of the wrapper by the feeding of the magazine, said means disposed in position to present the flat upper surface of the unfolded wrapper to the edge of the unfolded magazine, and said devices including means for receiving the magazine and wrapper and thereby folding the latter but not the former, means for folding the magazine and wrapper, a carrier for receiving the folded magazine and wrapper directly from said folding means, means for applying paste to the flap of the wrapper, mechanism for operating said carrier, means whereby the carrier discharges one magazine while receiving another, and means for folding said flap into place on the discharging magazine.

33. In a mailing machine, means for feeding the wrapper, mechanism for feeding the magazine in unfolded condition, and devices for effecting the initial folding of the wrapper by the feeding of the magazine, said mechanism for feeding the magazine being adapted to discharge the latter edgewise against the flat surface of the unfolded wrapper, means for folding the magazine and wrapper, a carrier for receiving the folded magazine and wrapper directly from said folding means, means for applying paste to the flap of the wrapper, mechanism for operating said carrier, means whereby the carrier discharges one magazine while receiving another, and means for folding said flap into place on the discharging magazine.

34. In a mailing machine, means for feeding the wrapper, mechanism for feeding the magazine in unfolded condition, devices for effecting the initial folding of the wrapper by the feeding of the magazine, said means disposed in position to present the flat upper surface of the unfolded wrapper to the edge of the unfolded magazine, and said devices including means for receiving the magazine and wrapper and thereby folding the latter but not the former, said mechanism having the discharge end thereof disposed in position to cause the edge of the magazine to strike the wrapper at a point to one side of the center of the latter, means for folding the magazine and wrapper, a carrier for receiving the folded magazine and wrapper directly from said folding means, means for applying paste to the flap of the wrapper, mechanism for operating said carrier, means whereby the carrier discharges one magazine while receiving another, and means for folding said flap into place on the discharging magazine.

35. In a mailing machine, means for feeding the wrapper, mechanism for feeding the magazine in unfolded condition, and devices for effecting the initial folding of the wrapper by the feeding of the magazine, said mechanism for feeding the magazine being adapted to discharge the latter edgewise against the flat surface of the unfolded wrapper, said mechanism having the discharge end thereof disposed in position to cause the edge of the magazine to strike the wrapper at a point to one side of the center of the latter, means for folding the magazine and wrapper, a carrier for receiving the folded magazine and wrapper directly from said folding means, means for applying paste to the flap of the wrapper, mechanism for operating said carrier, means whereby the carrier discharges one magazine while receiving another, and means for folding said flap into place on the one magazine.

36. In a mailing machine, means for feeding the wrapper, mechanism for feeding the magazine in unfolded condition, devices for effecting the initial folding of the wrapper by the feeding of the magazine, means for folding the magazine and wrapper, leaving the flap of the wrapper extended, an automatic paste brush for applying paste to the underside of said flap, means for engaging the flap to resist the pressure of said brush, means for operating said brush in and out of the path of the magazine folding means, and means for folding the flap into place.

37. In a mailing machine, means for feeding the wrapper, mechanism for feeding the magazine in unfolded condition, devices for effecting the initial folding of the wrapper by the feeding of the magazine, said means disposed in position to present the flat upper surface of the unfolded wrapper to the edge of the unfolded magazine, and said devices including means for receiving the magazine and wrapper and thereby folding the latter but not the former, means for folding the magazine and wrapper, leaving the flap of the wrapper extended, an automatic paste brush for applying paste to the under side of said flap, means for engaging the flap to resist the pressure of said brush, means for operating said brush in and out of the path of the magazine folding means, and means for folding the flap into place.

38. In a mailing machine, means for feeding the wrapper, mechanism for feeding the magazine in unfolded condition, devices for effecting the initial folding of the wrapper by the feeding of the magazine, said mechanism for feeding the magazine being adapted to discharge the latter edgewise against the flat surface of the unfolded wrapper, means for folding the magazine and wrapper, leaving the flap of the wrapper extended, an automatic paste brush for applying paste to the under side of said flap, means for engaging the flap to resist the pressure of said brush, means for operating said brush in and out of the path of the magazine folding means, and means for folding the flap into place.

39. In a mailing machine, means for feeding the wrapper, mechanism for feeding the magazine in unfolded condition, devices for effecting the initial folding of the wrapper by the feeding of the magazine, said means disposed in position to present the flat upper surface of the unfolded wrapper to the edge of the unfolded magazine, and said devices including means for receiving the magazine and wrapper and thereby folding the latter but not the former, said mechanism having the discharge end thereof disposed in position to cause the edge of the magazine to strike the wrapper at a point to one side of the center of the latter, means for folding the magazine and wrapper, leaving the flap of the wrapper extended, an automatic paste brush for applying paste to the under side of said flap, means for engaging the flap to resist the pressure of said brush, means for operating said brush in and out of the path of the magazine folding means, and means for folding the flap into place.

40. In a mailing machine, means for feeding the wrapper, mechanism for feeding the magazine in unfolded condition, devices for effecting the initial folding of the wrapper by the feeding of the magazine, said mechanism for feeding the magazine being adapted to discharge the latter edgewise against the flat surface of the unfolded wrapper, said mechanism having the discharge end thereof disposed in position to cause the edge of the magazine to strike the wrapper at a point to one side of the center of the latter, means for folding the magazine and wrapper, leaving the flap of the wrapper extended, an automatic paste brush for applying paste to the under side of said flap, means for engaging the flap to resist the pressure of said brush, means for operating said brush in and out of the path of the magazine folding means, and means for folding the flap into place.

41. In a mailing machine, means for feeding the wrapper, mechanism for feeding the magazine in unfolded condition, disposed in position whereby the forward edges of the wrapper and magazine are at right angles to each other, devices for effecting the initial folding of the wrapper by the initial contact of the unfolded magazine therewith, instrumentalities including a horizontally reciprocating blade for folding the magazine and wrapper, and a pasting mechanism having a movable element disposed in position to receive the blade and folded magazine and wrapper, said element being arranged to remain stationary until after the blade is withdrawn therefrom and adapted to revolve the magazine to fold and paste the flap of the wrapper in place.

42. In a mailing machine, means for feeding the wrapper, mechanism for feeding the magazine in unfolded condition, disposed in position whereby the forward edges of the wrapper and magazine are at right angles to each other, devices for effecting the initial folding of the wrapper by the initial contact of the unfolded magazine therewith, said means disposed in position to present the flat upper surface of the unfolded wrapper to the advancing edge of the unfolded magazine, said devices including means for receiving the magazine and wrapper and thereby folding the latter but not the former, instrumentalities including a horizontally reciprocating blade for folding the magazine and wrapper, and a pasting mechanism having a movable element disposed in position to receive the blade and folded magazine and wrapper, said element being arranged to remain stationary until after the blade is withdrawn therefrom and adapted to revolve the magazine to fold and paste the flap of the wrapper in place.

43. In a mailing machine, means for feeding the wrapper, mechanism for feeding the magazine in unfolded condition, disposed in position whereby the forward edges of the wrapper and magazine are at right angles to each other, devices for effecting the initial folding of the wrapper by the initial contact of the unfolded magazine therewith, said mechanism for feeding the magazine being adapted to discharge the latter edgewise against the flat surface of the unfolded wrapper, instrumentalities including a horizontally reciprocating blade for folding the magazine and wrapper, and a pasting mechanism having a movable element disposed in position to receive the blade and folded magazine and wrapper, said element being arranged to remain stationary until after the blade is withdrawn therefrom and adapted to revolve the magazine to fold and paste the flap of the wrapper in place.

44. In a mailing machine, means for feeding the wrapper, mechanism for feeding the magazine in unfolded condition, disposed in position whereby the forward edges of the wrapper and magazine are at right angles to each other, devices for effecting the initial folding of the wrapper by the initial contact of the unfolded magazine therewith, said means disposed in position to present the flat upper surface of the unfolded wrapper to the advancing edge of the unfolded magazine, said devices including means for receiving the magazine and wrapper and thereby folding the latter but not the former, said mechanism having the discharge end thereof disposed in position to cause the edge of the magazine to strike the wrapper at a point to one side of the center of the latter, instrumentalities including a horizontally reciprocating blade for folding the magazine and wrapper, and a pasting mechanism having a movable element disposed in position to receive the blade and folded magazine and wrapper, said element being arranged to remain stationary until after the blade is withdrawn therefrom and adapted to revolve the magazine to fold and paste the flap of the wrapper in place.

45. In a mailing machine, means for feeding the wrapper, mechanism for feeding the magazine in unfolded condition, disposed in position whereby the forward edges of the wrapper and magazine are at right angles to each other, devices for effecting the initial folding of the wrapper by the initial contact of the unfolded magazine therewith, said mechanism for feeding the magazine being adapted to discharge the latter edgewise against the flat surface of the unfolded wrapper, said mechanism having the discharge end thereof disposed in position to cause the edge of the magazine to strike the wrapper at a point to one side of the center of the latter, instrumentalities including a horizontally reciprocating blade for folding the magazine and wrapper, and a pasting mechanism having a movable element disposed in position to receive the blade and folded magazine and wrapper, said element being arranged to remain stationary until after the blade is withdrawn therefrom and adapted to revolve the magazine to fold and paste the flap of the wrapper in place.

Signed by me at Chicago, Illinois, this 18th day of January, 1912.

FRANK V. MOORE.

Witnesses:
E. H. CLEGG,
GEO. F. SCHMIDT.

Copies of this patent may be obtained for five cents each, by addressing the "Commissioner of Patents, Washington, D. C."